United States Patent [19]

Ferguson

[11] 4,201,517
[45] May 6, 1980

[54] AUTOMATIC CONTROL SELECTOR FOR A COMPRESSOR SYSTEM

[76] Inventor: John R. Ferguson, 6250 LBJ Freeway, Dallas, Tex. 75240

[21] Appl. No.: 875,112

[22] Filed: Feb. 3, 1978

[51] Int. Cl.² .................................................. F04B 49/00
[52] U.S. Cl. ........................................ 417/12; 417/26
[58] Field of Search ............................... 417/12, 26.27

[56] References Cited

U.S. PATENT DOCUMENTS

| | | | |
|---|---|---|---|
| 2,589,006 | 3/1952 | Yerger | 417/12 |
| 3,602,610 | 8/1971 | Bloom | 417/12 |
| 3,860,363 | 1/1975 | Silvern | 417/12 |
| 4,149,827 | 4/1979 | Hoffmann | 417/12 |

Primary Examiner—William L. Freeh
Attorney, Agent, or Firm—Robert V. Wilder; Albert M. Crowder, Jr.

[57] ABSTRACT

An automatic control selector responds to demand conditions to select the proper control mode for a compressor system that includes a compressor operable in a plurality of control modes for alternately controlling the compressor according to the demand conditions on the system. Upon the detection of heavy demand conditions and upon the detection of light demand conditions, the automatic control selector automatically switches the system into an appropriate control mode.

8 Claims, 2 Drawing Figures

AUTOMATIC CONTROL SELECTOR FOR A COMPRESSOR SYSTEM

This invention relates to compressor system control, and more particularly to demand condition control of a compressor system by switching the compressor operation into one of a number of control modes.

BACKGROUND OF INVENTION

Compressor systems generally include such components as a power driver, a compressor, and a tank for receiving pressurized gases. Typically, electric motors or internal combustion engines are utilized as a power driver in a compressor system. In use, pressurized gas is released from the tank for such purposes as spraying paint or inflating automobile tires. Normally, the compressor operates intermittently according to the demand of the system. When the pressure in the tank drops to a preselected level, the compressor system operates to raise the tank pressure and ceases to operate after the tank pressure reaches a second preselected level.

The operation of the compressor to produce pressurized gases is usually controlled by one of two methods. First, in a drive control mode, an electric motor or an engine driving a compressor is enabled and disabled through a start/stop switch. In the drive control mode, the compressor produces pressurized gases in response to the operation of the motor. Usually, the motor is automatically enabled and disabled in response to detection of certain pressure levels in the tank. Second, in an unloader control mode, an unloader is used to mechanically prevent the compressor from producing pressurized gases even though it is still driven, usually by an electric motor or a gasoline engine. When the compressor is unloaded, the compressor continues to run with only friction losses but no pressure is produced. Usually, the unloader is automatically enabled and disabled in response to detection of certain pressure levels in the tank.

Under light load conditions, a light demand for the pressurized gas, it is preferable to control compressor operation by starting and stopping the electric motor utilizing the drive control mode. Light load conditions are characterized by short run periods for the compressor followed by a relatively long time period in which the system does not require additional pressurized gases. By disabling the motor or engine instead of unloading the compressor mechanically, compressor wear is reduced and no power is consumed during the period of time that the compressor is not required to run.

The unloader control mode is preferable under heavy load conditions where the compressor system in operating near maximum load. Under heavy load conditions, the compressor will be required to start and stop frequently and to run for extended time periods. Since most internal combustion engines and electric motors are very inefficient during start-up, attempts to control the compressor by enabling and disabling the power driver would result in an increased energy requirement due to the frequent start-ups and may possibly lead to engine or motor damage. In contrast, if an unloader is used to control the compressor, the unloaded compressor requires little power input during the relatively short off periods, and the continuous operation of the power driver during the off period generally requires less energy than would a restart of the power driver. Thus unloader control is efficient and economical under heavy load conditions.

Some compressor systems operate under both heavy and light load conditions alternately. In such case, the system is usually provided with two control modes, a drive control mode for enabling and disabling the power driver, and an unloader control mode for mechanically unloading and loading the compressor. Selection between the two control modes is normally accomplished manually. Such manual selection results in inefficient operation of the compressor system because the operator does not quickly respond to changes in demand conditions. Also, manual selection between two control modes is inconvenient and time consuming for the operator. Thus, a need has arisen for an automatic control selector that automatically selects the control mode best suited to control a compressor system according to detected demand conditions.

SUMMARY OF THE INVENTION

In accordance with one embodiment of the present invention, an automatic control selector is provided in a compressor system for selecting between different control modes according to demand on the system. The compressor system includes a tank for containing pressurized gases and a compressor for pressurizing the gas. A mechanical compressor unloader is provided to mechanically unload the compressor to control the compressor in a mode that does not pressurize the gas. The unloader is controlled by an unloader control means that selectively enables and disables the unloader in response to a pressure sensor responsive to preselected pressure levels within the tank. A power driver is provided for driving the compressor.

The automatic control selector includes pressure sensors for monitoring pressure within the tank and switches the compressor system into an unloader control mode or a drive control mode in response to the detection of preselected pressure criteria indicating demand on the compressor system. When criteria is detected indicating a light demand on the compressor system, the system is switched into the drive control mode and circuitry is provided responsive to the pressure sensors for selectively enabling and disabling the power driver and for disabling the compressor unloader. When criteria is detected indicating a heavy demand on the compressor system, the system is switched into the unloader control mode and circuitry is provided for continuously enabling the power driver and for selectively enabling the compressor unloader to control the operation of the compressor.

In accordance with the present invention, the demand control selector comprises a first pressure sensitive switch for enabling the power driver upon the detection of a first preselected pressure within a tank and for disabling the power driver upon the detection of a second preselected pressure within the tank. The first pressure switch controls the operation of the compressor during light demand on the compressor system. A first time delay switch is provided for generating a signal in response to the first pressure switch, and a second pressure switch is provided to generate a signal in response to the detection of a third and fourth preselected pressure within the tank. A second time delay switch operates to continuously enable the drive means and to selectively enable the unloader in response to signals from the first time delay switch and the second pressure switch. The second time delay switch enables the unloader when selected criteria indicates a heavy demand on the compressor system. The first pressure switch and the second time delay switch operate in an electrical parallel relationship such that either switch may independently enable the power driver.

Further, in accordance with the present invention, a demand control selector is provided for monitoring the demand on the compressor system. When a heavy demand is indicated by relatively long runs of the compressor and short off periods, the demand control selector enables the unloader to control the output of the compressor. When a light demand on the compressor system is indicated by long off periods and relatively short run periods for the compressor, the demand control selector disables the unloader and enables a control mechanism that controls the operation of the compressor by selectively enabling and disabling the power driver of the compressor.

BRIEF DESCRIPTION OF THE DRAWINGS

A more complete understanding of the present invention will be readily appreciated by those of ordinary skill in the art as the same becomes better understood by reference to the following detailed description when considered in connection with the accompanying drawings.

Referring to the drawings.

DESCRIPTION OF THE PREFERRED EMBODIMENT

Figure 1:
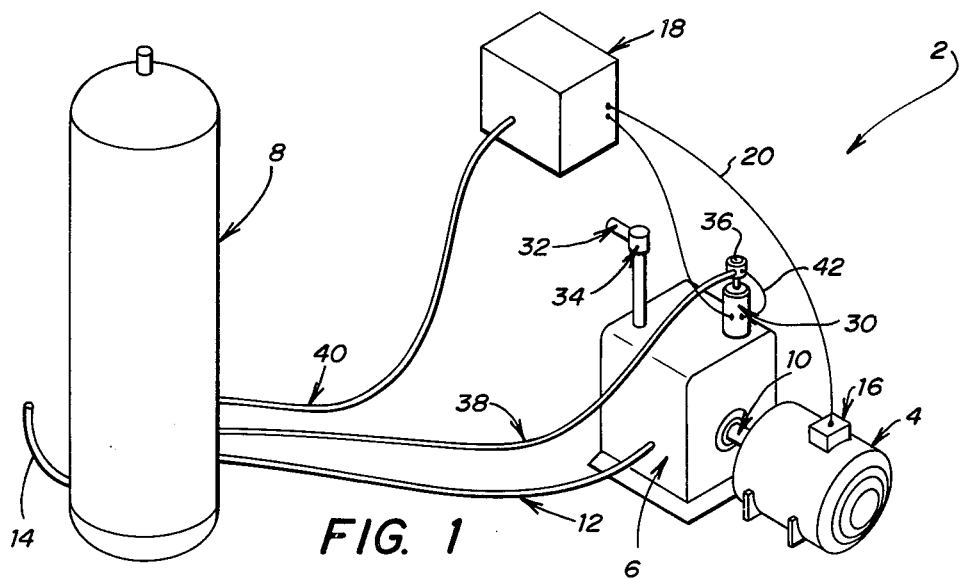
FIG. 1 symbolically illustrates a compressor system including an electric motor, a compressor, a tank, and control mechanisms.

Referring now to the drawings, wherein like reference characters designate like or corresponding parts throughout the several views, there is shown a compressor system 2 embodying the present invention. The main elements of the compressor system include an electric motor 4, an air compressor 6 and a tank 8. The electric motor 4 drives the compressor 6 by means of a rigid drive shaft 10. The compressor 6 pressurizes gases that are transported to a tank 8 through tubing 12. Tubing 14 is provided extending from tank 8 to transfer pressurized gases from the compressor system 2 to various outputs or loads (not shown).

For purposes of controlling the compressor system 2, electric motor 4 includes a start/stop relay switch 16 for starting and stopping the electric motor. An automatic control selector 18 is electrically connected to relay switch 16 by an electrical conductor 20. Automatic control selector 18 controls the operation of electric motor 4 by selectively enabling the electric motor by means of relay switch 16.

The air compressor 6 includes a mechanical unloader 30 for controlling the output of the compressor. A portion of mechanical unloader 30 is shown in FIG. 1 extending from the top of compressor 6, but it is to be understood that the location of the unloader is for illustration purposes. It should be understood that the unloader 30 may be located completely within the housing of compressor 6. In the preferred embodiment, unloader 30 selectively prevents compressor 6 from pressurizing gases by rendering ineffective the compressor valves. When in an unloaded condition, although the compressor 6 is still being driven by the electric motor 4, the unloader 30 has disabled the compressor 6 by disabling the compressor valves and pressure is not produced. Since a gas is not being pressurized, it is only necessary for the electric motor 4 to overcome friction losses in order to drive the air compressor 6.

Although unloader 30 has been described as a conventional unloader of the type that holds open the compressor valves, it is to be understood that any conventional compressor unloader may be used. Another conventional compressor unloader prevents a compressor from pressurizing gases by muffling the intake of the compressor. In an alternate embodiment, the unloader may selectively prevent the compressor from pressurizing a gas by closing a valve 34 to muffle an air intake 32 of the compressor 6.

The operation of unloader 30 is controlled by unloader control 36 which is located in FIG. 1 for illustration purposes above unloader 30. Unloader control 36 is a pressure sensitive device that senses pressure in the tank 8 through a tubing 38. When the pressure inside the tank 8 drops to a preselected level, unloader control 36 transmits a load signal through conductor 42 to unloader 30. Unloader 30 then releases the compressor valves to allow compressor 6 to pressurize a gas. When the pressure inside the tank 8 rises to a preselected level, control 36 detects such pressure and generates an unload signal which is transmitted through conductor 42 to the unloader 30. The compressor valves are held open by the unloader 30 thereby preventing the compressor 6 from pressurizing gas. In this manner, the pressure within tank 8 is maintained within a preselected range without starting or stopping the electric motor 4. In the preferred embodiment, unloader control 36 is set to transmit a signal to unloader 30 causing it to unload the compressor at a pressure of 110 pounds per square inch (hereinafter psi) and causing the compressor 6 to be loaded at 90 psi.

Automatic control selector 18 is provided to automatically select the proper control mode for the compressor system. During periods of heavy demand the control selector 18 places the compressor system 2 in an unloader control mode. In the unloader control mode, the control selector 18 will enable both the electric motor 4 and the unloader 30. The electric motor 4 will run continuously and the operation of the compressor will be controlled by the unloader 30 through the unloader control 36. During light demand conditions, automatic control selector 18 places the compressor system 2 in a drive control mode which will hereinafter be referred to as a motor control mode. In the motor control mode, the unloader 30 is disabled and cannot affect the operation of the compressor 6, and the automatic control selector 18 directly controls the operation of the compressor system by selectively generating a start and stop signal which is transmitted by means of conductor 20 to the start/stop relay switch 16 to control energization of the motor 4.

Automatic control selector 18 typically consists of any of a number of monitoring circuits capable of monitoring demand conditions on the compressor system 2. Demand on the compressor system 2 is indicated by the rate at which pressure drops within the tank 8 when the compressor 6 is not operating, and by the rate at which the pressure within tank 8 rises when the compressor 6 is operational to compress a gas. Therefore, automatic control selector 18 may consist of any device that directly or indirectly monitors the rate of pressure change within the tank 8 and then selects the proper mode of controlling the compressor system 2.

In a preferred embodiment, the demand control selector 18 detects the pressure within the tank 8 through tubing 40 and generates signals to control the compressor system 2 such that the tank pressure is maintained within certain preset levels. Basically, the control selector 18 determines heavy and light demand conditions by monitoring the rate of pressure change within tank 8 and selects the proper control mode accordingly. If the compressor system 2 is in the motor control mode and the pressure within the tank 8 drops below 97 psi and is not raised to 110 psi within two minutes, the control selector 18 generates a signal to place the compressor system 2 in the unloader control mode. When the compressor system 2 is operating in the unloader control mode, the control selector 18 will switch the compressor system into the motor control mode when the pressure within the tank 8 has been maintained above 95 psi for more than 10 minutes, and during this 10 minute interval, the pressure within the tank 8 has not dropped below 97 psi without rising to 110 psi within two minutes after dropping below 97 psi. In this manner, the control selector 18 monitors the rate of pressure change within the tank 8, as will be hereinafter described in greater detail.

Figure 2:
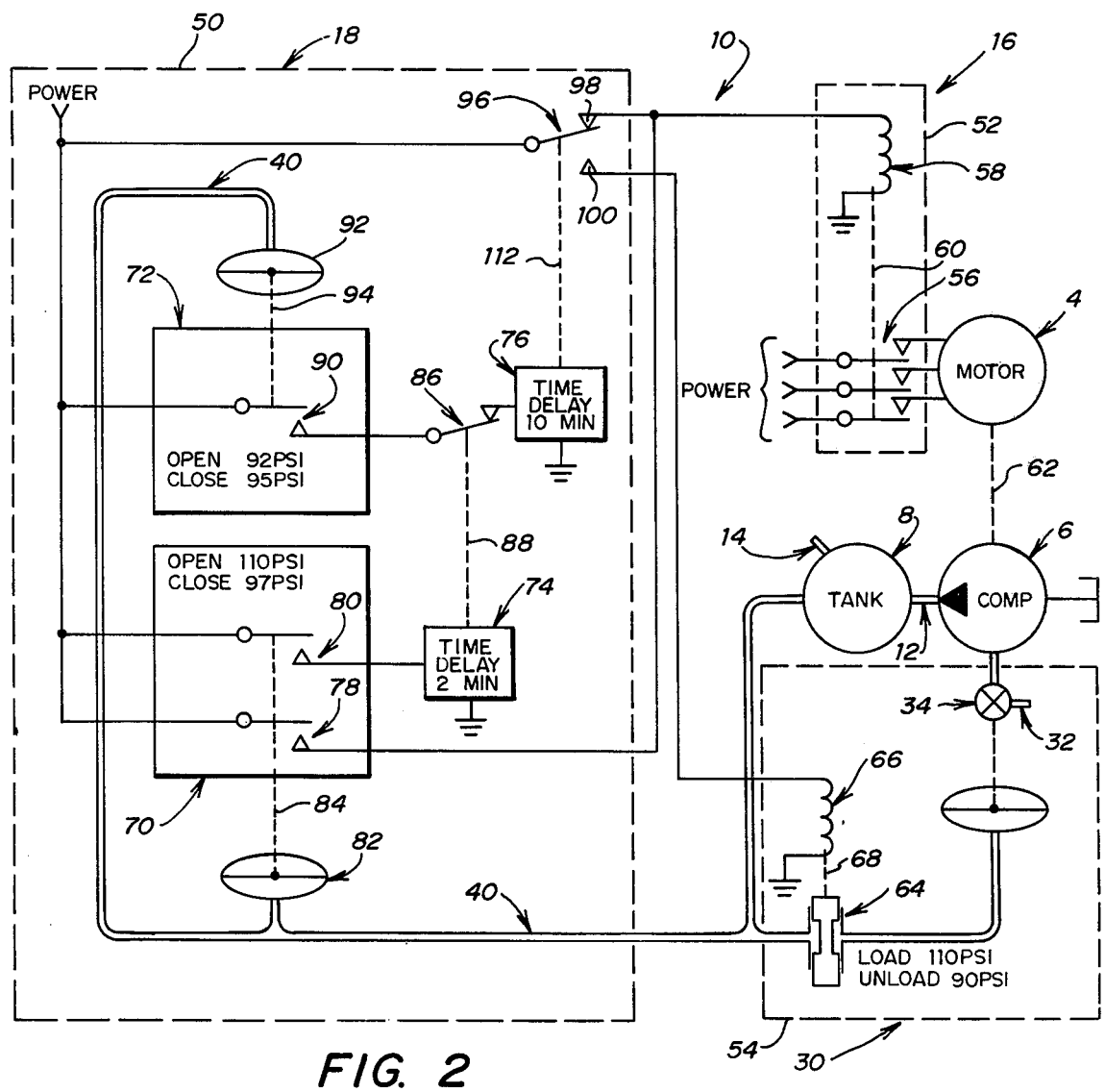
FIG. 2 is a schematic circuit diagram of a demand control selector and a compressor system.

Referring now to FIG. 2, a detailed schematic circuit diagram of the control selector 18 and compressor system 2 is shown. The components of the control selector 18 are symbolically shown within dotted line 50. Also shown symbolically are the electric motor 4, the air compressor 6 and the tank 8. The components of start-/stop relay switch 16 are shown within dotted line 52. The unloader 30, the air intake 32 and the control valve 34 are symbolically shown within dotted line 54.

As mentioned, the electric motor 4 is controlled by relay switch 16 which includes three contacts 56 that are connected to the electric motor and to a 3-phase power source (not shown). Contacts 56 are normally open such that the motor 4 is disabled. Mechanically connected to the contacts 56 is a solenoid 58 as is symbolically shown by dotted line 60. When a current passes through the solenoid 58, contacts 56 are closed, starting the motor 4.

The air compressor 6 is selectively unloaded by a valve lifter 64 that disables the compressor at 110 psi and is set to enable the compressor at 90 psi. Mechanically connected to the valve lifter 64 is a solenoid 66 as is symbolically shown by dotted line 68. The valve lifter 64 will automatically disable the compressor when the pressure within tank 8 reaches 110 psi unless the solenoid 66 is activated. If current is flowing in the solenoid 66, then the valve lifter 64 is itself disabled and cannot operate to disable the compressor. When current is flowing in solenoid 66, compressor system 2 is in the motor control mode. When current is not flowing in solenoid 66, compressor system 2 is in the unloader control mode.

The basic components of demand control selector 18 are pressure switches 70 and 72 and time delay relays 74 and 76 which are all shown within dotted out line 50. Pressure switch 70 includes two contacts, 78 and 80. Contacts 78 and 80 are mechanically connected to a pressure responsive transducer 82 as indicated by dotted line 84. The pressure responsive transducer 82 communicates with the tank 8 by means of tubing 40, and when the pressure within the tank 8 reaches 110 psi, the transducer responds to the open switch 70. When the pressure within the tank 8 drops to 97 psi, the transducer 82 again closes the switch 70.

An interconnection between an electrical power source (not shown) and the solenoid 58 is established by closing the contact 78. The contact 80 of the pressure switch 70 is connected between a power source and the time delay relay 74 which is connected to ground such that an electrical path exists from the power source to ground through contact 80. When the pressure within the tank 8 drops to 97 psi, the contact 80 of pressure switch 70 closes placing a voltage across the time delay relay 74 thereby starting a time delay interval. When the pressure within the tank 8 rises to 110 psi, contact 80 is opened which resets the time delay relay 74.

Operated by the time delay relay 74 is a contact 86 as indicated by dotted line 88. The contact 86 is electrically connected in series between the pressure switch 72 and the time delay relay 76. When the relay 74 times out, it closes the contact 86 to form an electical path between the pressure switch 72 and the time delay relay 76. In the preferred embodiment, the time delay period of relay 74 is two minutes. Thus, when pressure switch 70 closes and starts time delay relay 74, the contact 86 will open two minutes after starting the time delay relay unless the relay is reset by the opening of pressure switch 70 before two minutes have elapsed.

Pressure switch 72 includes a contact 90 which is connected in series between an electrical power source (not shown) and the contact 86. Thus an electrical path from the power source to ground is formed through the series connection of contact 90, contact 86 and the time delay relay 76. Mechanically interconnected to the contact 90 is a pressure responsive transducer 92 as indicated by dotted line 94. When the pressure within the tank 8 drops to 92 psi, the pressure responsive transducer 92 opens contact 90, and when the tank 8 pressure rises to 95 psi, the contact is closed. When both contacts 90 and 86 are closed, time delay relay 76 is started.

Time delay relay 76 mechanically operates a contact 96 to selectively engage either contact point 98 or 100. When the time delay relay 76 is reset, contact 96 is connected to contact point 98, and the compressor system 2 is placed in the unloader control mode. When contacts 90 and 86 are closed at the same time, time delay relay 76 is started and set to run for a delay period of 10 minutes. Therefore, if contacts 90 and 86 remain closed for a period of 10 minutes, the contact 96 will be operated by means of a mechanical connection illustrated by dotted line 112, and be disengaged from contact point 98 and connected to the contact point 100. In this latter position, the compressor system 2 is in the motor control mode.

The compressor system 2 will then remain in the motor control mode until time delay relay 76 is reset by the opening of either contact 86 or 90. The operation of the automatic control selector 18 to place the compressor system 2 in either the unloader control or the motor control may be better understood by following the operation through various control cycles. First, assume that the compressor system 2 is enabled and has been in a condition of no demand for an extended period of time. In this condition, the compressor 6 will have operated to raise the pressure within the tank 8 to 110 psi. Since there has been no demand on the system, the pressure within the tank 8 has remained at 110 psi.

When the pressure originally rose to 110 psi, contact 80 opened and reset time delay relay 74 and caused contact 86 to close. The contact 90 was already closed because the pressure was well above 95 psi. When both contacts 90 and 86 closed, the time delay relay 76 started and timed out in 10 minutes, whereupon relay 76 caused contact 96 to disengage contact point 98 and to move into connection with contact point 100. Since contact 78 was open and contact 96 was disconnected from contact point 98, solenoid 58 was deenergized and motor 4 was stopped. When contact 96 was connected to contact point 100, solenoid 66 was energized and unloader 30 was disabled placing the compressor system 2 in the motor control mode.

Next, assume that a light demand is placed on compressor system 2. The light demand causes the pressure in tank to drop slowly. When tank pressure reaches 97 psi the contact 78 of pressure switch 70 closes. Closing the contact 78 causes the solenoid 58 to be energized thereby starting the motor 4 which drives compressor 6. In the motor control mode, unloader 30 has been disabled allowing the compressor 6 to pressurize a gas within the tank 8. Since there is only a light demand, the pressure quickly rises to 110 psi in less than two minutes. At this pressure, contact 78 of switch 70 opens deenergizing solenoid 58 and stopping motor 4.

If the light demand now changes into a heavy demand then the pressure again drops to 97 psi, and the compressor will begin to generate pressure as previously described with regard to light demand conditions. When the pressure reaches 97 psi, contact 80 will close starting heavy demand time delay relay 74. Since heavy demand conditions are present, the compressor is unable to raise the pressure within tank 8 to 110 psi within two minutes. Thus, at the end of two minutes after starting, relay 74 will open the contact 86 which will reset the relay 76 causing contact 96 to move from contact point 100 into connection with contact point 98, thereby placing compressor system 2 in the unloader control mode.

During a heavy demand period in the unloader control mode, the unloader 30 and unloader control 36 will control the operation of compressor system 2. When the pressure within tank 8 reaches 110 psi, unloader 30 will lift the compressor valves preventing the compressor from pressurizing a gas. The pressure in tank 8 will then quickly drop to 90 psi because of the heavy demand on the system. At 90 psi, unloader 30 will enable the compressor valves and the compressor will begin to compress a gas until tank pressure reaches 110 psi.

Assume now that demand conditions change from a heavy demand to a light demand. The compressor system 2 is in the unloader control mode and tank pressure rises to 110 psi. At this pressure, the unloader lifts the valves to prevent the compressor from generating pressure, and contacts 90 and 86 are both in a closed position thereby starting the relay 76. Since demand conditions are now light, the pressure within tank 8 remains above 97 psi for a period longer than 10 minutes. Thus, at the end of the 10 minute period, relay 76 causes contact 96 to disengage contact point 98 and engage contact point 100 to place the compressor system 2 in the motor control mode. In the motor control mode the system will again cycle between 97 psi and 110 psi so long as the light demand conditions remain.

It will be apparent to those skilled in the art that the compressor system 2 as controlled by demand control selector 18 is subject to a wide variety of control cycles depending on the exact rate of change of pressure within tank 8. However, it will be apparent that the control cycles generated by demand control selector 18 will be dependent on the rate of change of pressure within tank 8 and that the demand control selector will place the system into the motor control mode during light demand conditions and the unloader control mode during heavy demand conditions.

Although, in the preferred embodiment the rate of tank pressure change is monitored directly to determine demand conditions, it is apparent that tank pressure change and demand may be monitored indirectly. Where the compressor is controlled by separate control devices to maintain pressure within preselected levels, demand on the compressor system may be indirectly monitored by measuring the run time and the off time of the compressor.

Although only one embodiment of the present invention has been described in the foregoing detailed description, it will be understood that the invention is not limited to the embodiment disclosed, but is capable of numerous rearrangement, modifications, and substitution of parts and elements without departing from the spirit of the invention.

What is claimed is:

1. An automatic control selector for a compressor system including a tank for containing pressurized gases, a compressor for pressurizing gases within the tank, an unloader for mechanically unloading the compressor to prevent the compressor from pressurizing gases, an unloader control device for selectively enabling and disabling the unloader, and a drive device for mechanically driving the compressor comprising:

first pressure sensitive means for enabling the drive device to operate in a drive control mode upon detection of a first preselected pressure within the tank and for disabling the drive device upon detection of a second preselected pressure within the tank, said first pressure sensitive means for controlling the operation of the compressor during light load demand on the compressor system to maintain tank pressure, such that the unloader is disabled during the drive control mode to prevent the unloader from disabling the compressor;

first timing means actuated by said first pressure sensitive means for generating a first mode signal when said second preselected pressure within the tank is not reached within a preselected time period after enabling of the drive device;

second pressure sensitive means responsive to detection of a third preselected pressure within the tank for generating a second mode signal;

second timing means actuated by said first and second mode signals for enabling the drive device and the unloader to operate in an unloader control mode during heavy load demand on the compressor system to maintain tank pressure; and said second timing means further actuated by said first and second mode signals for disabling the unloader and for enabling the drive device to operate in said drive control mode when said first preselected pressure is maintained within the tank for a second preselected time period.

2. The automatic control selector of claim 1 wherein said first preselected time period is two minutes.

3. The automatic control selector of claim 1 wherein said second preselected time period is ten minutes.

4. The automatic control selector of claim 1 wherein said first pressure sensitive means includes:

a two-pole pressure switch having first and second contacts, said drive device being enabled in response to said first contact closing, said first timing means being responsive to said second contact closing.

5. The automatic control selector of claim 4 wherein said two-pole pressure switch opens said first and second contacts when the pressure within the tank is 110 psi and closes the contacts when the pressure within the tank is 97 psi.

6. The automatic control selector of claim 1 wherein said second timing means comprises:
 a single-pole, double-throw time delay relay having first and second contact positions, said single-pole, double-throw time delay relay for disabling the unloader in said first contact position and for enabling the drive device and the unloader in said second contact position.

7. The automatic control selector of claim 6 wherein said single-pole, double-throw time delay relay is reset and placed in said second contact position in response to a signal from said second pressure sensitive means.

8. The automatic control selector of claim 6 wherein said single-pole, double-throw time delay relay is reset and placed in said second contact position in response to a signal from said first timing means.

* * * * *